United States Patent
Chen (10) Patent No.: US 10,235,011 B2
(45) Date of Patent: Mar. 19, 2019

(54) APPLICATION ICON ADAPTIVE ADJUSTMENT METHOD AND TERMINAL

(71) Applicant: Yulong Computer Telecommunication Scientific (Shenzhen) Co., Ltd., Shenzhen, Guangdong (CN)

(72) Inventor: Yongdong Chen, Guangdong (CN)

(73) Assignee: YULONG COMPUTER TELECOMMUNICATION SCIENTIFIC (Shenzhen) Co., LTD., Shenzhen (CN)

(*) Notice: Subject to any disclaimer, the term of this patent is extended or adjusted under 35 U.S.C. 154(b) by 148 days.

(21) Appl. No.: 15/037,876

(22) PCT Filed: Dec. 15, 2013

(86) PCT No.: PCT/CN2013/089465
§ 371 (c)(1),
(2) Date: May 19, 2016

(87) PCT Pub. No.: WO2015/085599
PCT Pub. Date: Jun. 18, 2015

(65) Prior Publication Data
US 2016/0291837 A1    Oct. 6, 2016

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 9/453* (2018.02); *H04M 1/72569* (2013.01); *H04M 1/72586* (2013.01)

(58) Field of Classification Search
CPC ...................................................... G06F 3/048
See application file for complete search history.

(56) References Cited

U.S. PATENT DOCUMENTS

| 2014/0082515 A1* | 3/2014 | Baalu | G06F 3/0481 715/745 |
| 2014/0283142 A1* | 9/2014 | Shepherd | G06F 3/0482 726/30 |

FOREIGN PATENT DOCUMENTS

| CN | 101795321 A | 8/2010 |
| CN | 102081501 A | 6/2011 |

(Continued)

OTHER PUBLICATIONS

Supplementary European Search Report issued in counterpart European Application No. EP 13 89 9239.1, dated May 29, 2017, 10 pages.

(Continued)

*Primary Examiner* — Pei Yong Weng
(74) *Attorney, Agent, or Firm* — BAYES PLLC (57) ABSTRACT

Provided are an application icon adaptive adjustment method and terminal, the method comprising: collecting statistics on the running duration and/or use frequency of at least one application program in one or more state modes of a terminal; detecting the current state mode of the terminal; and according to the statistical running duration and/or use frequency of the at least one application program in the current state mode, adjusting the display status of the application icon on a terminal interface. The technical solution of the present invention adjusts the position of an application icon on a terminal interface according to the use habit of a user, thus enabling the user to quickly find a desired application icon.

12 Claims, 4 Drawing Sheets

(51) Int. Cl.
    *G06F 3/0482*    (2013.01)
    *H04M 1/725*    (2006.01)
    *G06F 9/451*    (2018.01)

(56)         References Cited

FOREIGN PATENT DOCUMENTS

| CN | 102609164 A | 7/2012 |
| CN | 103150169 A | 6/2013 |
| CN | 103218243 A | 7/2013 |
| EP | 2200263 A1 | 6/2010 |
| WO | 2013/006654 A2 | 1/2013 |

OTHER PUBLICATIONS

Office Action issued in counterpart Chinese Application No. 201380068854.7, dated Mar. 17, 2017, 5 pages.
Office Action issued in counterpart Chinese Application No. 201380068854.7, dated Sep. 28, 2017, 6 pages.
Office Action issued in counterpart Chinese Application No. 201380068854.7, dated Apr. 10, 2018, 6 pages.

* cited by examiner

APPLICATION ICON ADAPTIVE ADJUSTMENT METHOD AND TERMINAL

FIELD OF THE INVENTION

The present invention relates to the technical field of communications, and specifically relates to an application icon adaptive adjustment method and a terminal.

BACKGROUND OF THE INVENTION

Application icons on a terminal are increasing, and at present, these application icons are mainly arranged at random, or arranged according to the drag positions of a user, or arranged according to the statistical use frequency of application programs.

No mode above sufficiently considers the use habit of the user, even the solution of collecting statistics on the use frequency of application programs only considers the use frequency of the user but does not consider other factors, so the solution still cannot meet the requirement of the user.

SUMMARY OF THE INVENTION

Based on the above problems, the present invention proposes a new application icon adaptive adjustment technology, namely, the display status of each application icon on a terminal desktop is adjusted by acquiring the use condition of the corresponding application program in each state mode of a terminal.

According to an aspect of the present invention, provided is an application icon adaptive adjustment method, including: collecting statistics on the running duration and/or use frequency of at least one application program in one or more state modes of a terminal; detecting the current state mode of the terminal; and according to the statistical running duration and/or use frequency of the at least one application program in the current state mode, adjusting the display status of the application icon on a terminal interface.

The state mode of the terminal can be understood as a state of the terminal. The terminal has various set parameters, and once a user or the terminal sets a parameter, the set parameter can be regarded as a state of the terminal. For example, the user sets enabling a terminal positioning service, then a state mode of the terminal can be determined, and statistics on the running duration or use frequency of each application in the state mode can be collected. The display status of the application icon is adjusted according to the statistical data. For example, when the terminal enables the positioning service, statistics on longest use time of Baidu map application in the state mode is collected. When the terminal enables the positioning service next time, the terminal discovers that the use time of Baidu map is the longest, and then displays the icon of the Baidu map in the front of the desktop or highlights the icon of the Baidu map, thus facilitating the user to search.

Accordingly, the present invention can really consider the use habit of the user, statistics on the use condition of an application is collected in each parameter setting condition, running state or terminal pose of the terminal, and the display status of the application icon is adjusted according to the statistical data in the state mode when the terminal is detected to be in the previous state again.

In the above technical solution, preferably, the step of adjusting the display status of an application icon on the terminal desktop may include: adjusting the color, shape and size of the application icon and/or the display position of the application icon on the terminal interface.

The icon color of the application mostly used by the user can be changed into a color different from that of other applications, or the icon is enlarged, or the icon is displayed in the front of the interface.

In any above technical solution, preferably, the display status of each application icon is adjusted according to the length of the running duration and/or the use frequency.

In any above technical solution, preferably, the state mode includes any one or more of a horizontal screen display mode, a vertical screen display mode and multiple scenario modes of the terminal, wherein the multiple scenario modes at least include a silent mode, a conference mode, an airplane mode and an outdoor mode. In fact, each parameter setting of the terminal can be referred to as a state mode, e.g., WIFI setting, Bluetooth setting, font setting, etc.

In any above technical solution, preferably, the method may further include: calculating a state mode of longest running duration and/or highest use frequency of at least one application program in one or more state modes of the terminal; when any application program of the one or more application programs is started, judging whether the current state mode of the terminal corresponds to the state mode of longest running duration and/or highest use frequency of the any application program; and if the judgment result is no, then adjusting the current state mode of the terminal to the state mode of longest running duration and/or highest use frequency of the any application program.

When the user starts an application, the state mode of the terminal when the application is used previously can be judged according to the previous statistical data, and if the current state mode of the terminal is different from the judged state mode, the state mode of the terminal is switched.

It is supposed that the user uses Youku application most frequently in the horizontal screen state. When the user starts the Youku application, whether the terminal is currently in the horizontal screen state is judged, and if not, the user is reminded of switching the terminal to the horizontal screen state, thus satisfying the use habit of the user.

In any above technical solution, preferably, the method may further include: when the terminal is switched to the current state mode, reminding the user whether to enable the application program with the longest running duration and/or highest use frequency in the current state mode.

When the terminal enters a certain state mode, the terminal determines the application program mostly used by the user according to the state mode, and then reminds the user whether to enable the application program or directly enables the application program. For example, when the terminal enables the positioning service, the terminal judges that Baidu map is used mostly, and then reminds the user whether to enable the Baidu map or directly enables the Baidu map.

According to another aspect of the present invention, further provided is a terminal, including: a statistical unit, used for collecting statistics on the running duration and/or use frequency of at least one application program in one or more state modes of a terminal; a detection unit, used for detecting the current state mode of the terminal; and an adjustment unit, connected to the statistical unit and the detection unit, and used for, according to the statistical running duration and/or use frequency of the at least one application program in the current state mode, adjusting the display status of the application icon on a terminal interface.

The state mode of the terminal can be understood as a state of the terminal, the terminal has various set parameters, and once a user or the terminal sets a parameter, the set parameter can be regarded as a state of the terminal. For example, the user sets enabling a terminal positioning service, then a state mode of the terminal can be determined, and statistics on the running duration or use frequency of each application in the state mode can be collected. The display status of the application icon is adjusted according to the statistical data. For example, when the terminal enables the positioning service, statistics on longest use time of Baidu map application in the state mode is collected. When the terminal enables the positioning service next time, the terminal discovers that the use time of Baidu map is the longest, and then displays the icon of the Baidu map in the front of the desktop or highlights the icon of the Baidu map, thus facilitating the user to search.

Accordingly, the present invention can really consider the use habit of the user, statistics on the use condition of an application is collected in each parameter setting condition, running state or terminal pose of the terminal, and the display status of the application icon is adjusted according to the statistical data in the state mode when the terminal is detected to be in the previous state again.

In the above technical solution, preferably, the adjustment unit is used for adjusting the color, shape and size of the application icon and/or the display position of the application icon on the terminal interface. The icon color of the application mostly used by the user can be changed into a color different from that of other applications, or the icon is enlarged, or the icon is displayed in the front of the interface.

In the above technical solution, preferably, the adjustment unit is further used for adjusting the display status of each application icon according to the length of the running duration and/or the use frequency.

In the above technical solution, preferably, the state mode includes any one or more of a horizontal screen display mode, a vertical screen display mode and multiple scenario modes of the terminal, wherein the multiple scenario modes at least include a silent mode, a conference mode, an airplane mode and an outdoor mode. In fact, each parameter setting of the terminal can be referred to as a state mode, e.g., WIFI setting, Bluetooth setting, font setting, etc.

In any above technical solution, preferably, the terminal may further include: a calculation unit, used for calculating a state mode of longest running duration and/or highest use frequency of at least one application program in one or more state modes of the terminal; and a judgment unit, connected to the calculation unit, and used for, when any application program of the one or more application programs is started, judging whether the current state mode of the terminal corresponds to the state mode of longest running duration and/or highest use frequency of the any application program; wherein the adjustment unit is further used for, if the judgment result of the judgment unit is no, adjusting the current state mode of the terminal to the state mode of longest running duration and/or highest use frequency of the any application program.

When the user starts an application, the state mode of the terminal when the application is used previously can be judged according to the previous statistical data, and if the current state mode of the terminal is different from the judged state mode, the state mode of the terminal is switched.

It is supposed that the user uses Youku application most frequently in the horizontal screen state. When the user starts the Youku application, whether the terminal is currently in the horizontal screen state is judged, and if not, the user is reminded of switching the terminal to the horizontal screen state, thus satisfying the use habit of the user.

In any above technical solution, preferably, the terminal may further include: a reminding unit, connected to the detection unit, and used for, when the terminal is switched to the current state mode, reminding the user whether to enable the application program with the longest running duration and/or highest use frequency in the current state mode.

When the terminal enters a certain state mode, the terminal determines the application program mostly used by the user according to the state mode, and then reminds the user whether to enable the application program or directly enables the application program. For example, when the terminal enables the positioning service, the terminal judges that Baidu map is used mostly, and then reminds the user whether to enable the Baidu map or directly enables the Baidu map.

According to a further aspect of the present invention, provided is a program product stored in a nonvolatile machine readable medium and used for adjusting the display of an application icon, the program product including a machine executive instruction enabling a computer system to execute the following steps: collecting statistics on the running duration and/or use frequency of at least one application program in one or more state modes of a terminal; detecting the current state mode of the terminal; and according to the statistical running duration and/or use frequency of the at least one application program in the current state mode, adjusting the display status of the application icon on a terminal interface.

According to a still further aspect of the present invention, provided is a nonvolatile machine readable medium storing a program product for adjusting the display of an application icon, the program product including a machine executive instruction enabling a computer system to execute the following steps: collecting statistics on the running duration and/or use frequency of at least one application program in one or more state modes of a terminal; detecting the current state mode of the terminal; and according to the statistical running duration and/or use frequency of the at least one application program in the current state mode, adjusting the display status of the application icon on a terminal interface.

According to a still further aspect of the present invention, provided is a machine readable program, which enables a machine to execute the application icon adaptive adjustment method in any above technical solution.

According to a still further aspect of the present invention, provided is a storage medium storing a machine readable program, wherein the machine readable program enables a machine to execute the application icon adaptive adjustment method in any above technical solution.

DETAILED DESCRIPTION OF THE EMBODIMENTS

In order to understand the above purposes, features and advantages of the present invention more clearly, the present invention will be further described in detail below in combination with the accompanying drawings and specific embodiments. It should be noted that, the embodiments of the present application and the features in the embodiments can be combined with each other without conflicts.

Many specific details are described below for sufficiently understanding the present invention, however, the present invention may be further implemented by adopting other modes different from those described herein, so the protection scope of the present invention is not limited by the specific embodiments disclosed below.

Figure 1:
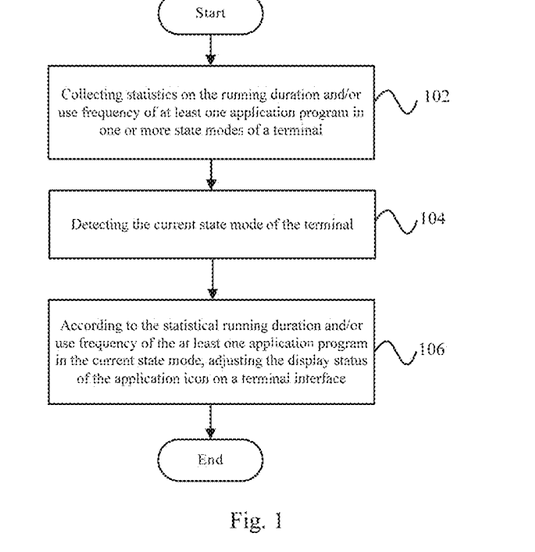
FIG. 1 shows a flow diagram of an application icon adaptive adjustment method according to an embodiment of the present invention.

FIG. 1 shows a flow diagram of an application icon adaptive adjustment method according to an embodiment of the present invention.

As shown in FIG. 1, the application icon adaptive adjustment method according to an embodiment of the present invention may include the following steps: 102, collecting statistics on the running duration and/or use frequency of at least one application program in one or more state modes of a terminal; 104, detecting the current state mode of the terminal; and 106, according to the statistical running duration and/or use frequency of the at least one application program in the current state mode, adjusting the display status of the application icon on a terminal interface.

The state mode of the terminal can be understood as a state of the terminal. The terminal has various set parameters, and once a user or the terminal sets a parameter, the set parameter can be regarded as a state of the terminal. For example, the user sets enabling a terminal positioning service, then a state mode of the terminal can be determined, and statistics on the running duration or use frequency of each application in the state mode can be collected. The display status of the application icon is adjusted according to the statistical data. For example, when the terminal enables the positioning service, statistics on longest use time of Baidu map application in the state mode is collected. When the terminal enables the positioning service next time, the terminal discovers that the use time of Baidu map is the longest, and then displays the icon of the Baidu map in the front of the desktop or highlights the icon of the Baidu map, thus facilitating the user to search.

Accordingly, the present invention can really consider the use habit of the user, statistics on the use condition of an application is collected in each parameter setting condition, running state or terminal pose of the terminal, and the display status of the application icon is adjusted according to the statistical data in the state mode when the terminal is detected to be in the previous state again.

In the above technical solution, preferably, the step of adjusting the display status of an application icon on the terminal desktop may include: adjusting the color, shape and size of the application icon and/or the display position of the application icon on the terminal interface.

The icon color of the application mostly used by the user can be changed into a color different from that of other applications, or the icon is enlarged, or the icon is displayed in the front of the interface.

In any above technical solution, preferably, the display status of each application icon is adjusted according to the length of the running duration and/or the use frequency.

In any above technical solution, preferably, the state mode includes any one or more of a horizontal screen display mode, a vertical screen display mode and multiple scenario modes of the terminal, wherein the multiple scenario modes at least include a silent mode, a conference mode, an airplane mode and an outdoor mode. In fact, each parameter setting of the terminal can be referred to as a state mode, e.g., WIFI setting, Bluetooth setting, font setting, etc.

In any above technical solution, preferably, the method may further include: calculating a state mode of longest running duration and/or highest use frequency of at least one application program in one or more state modes of the terminal; when any application program of the one or more application programs is started, judging whether the current state mode of the terminal corresponds to the state mode of longest running duration and/or highest use frequency of the any application program; and if the judgment result is no, adjusting the current state mode of the terminal to the state mode of longest running duration and/or highest use frequency of the any application program.

When the user starts an application, the state mode of the terminal when the application is used previously can be judged according to the previous statistical data, and if the current state mode of the terminal is different from the judged state mode, the state mode of the terminal is switched.

It is supposed that the user uses Youku application most frequently in the horizontal screen state. When the user starts the Youku application, whether the terminal is currently in the horizontal screen state is judged, and if not, the user is reminded of switching the terminal to the horizontal screen state, thus satisfying the use habit of the user.

In any above technical solution, preferably, the method may further include: when the terminal is switched to the current state mode, reminding the user whether to enable the application program with the longest running duration and/or highest use frequency in the current state mode.

When the terminal enters a certain state mode, the terminal determines the application program mostly used by the user according to the state mode, and then reminds the user whether to enable the application program or directly enables the application program. For example, when the terminal enables the positioning service, the terminal judges that Baidu map is used mostly, and then reminds the user whether to enable the Baidu map or directly enables the Baidu map.

The application icon adaptive adjustment method in the present invention will be further described below in combination with FIG. 2A to FIG. 6.

Figure 2A:
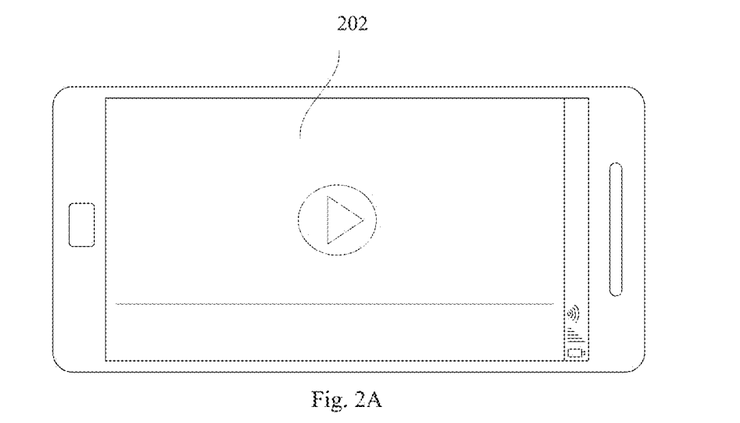
FIG. 2A and FIG. 2B respectively show a schematic diagram of a statistical application use condition according to an embodiment of the present invention.
Figure 2B:
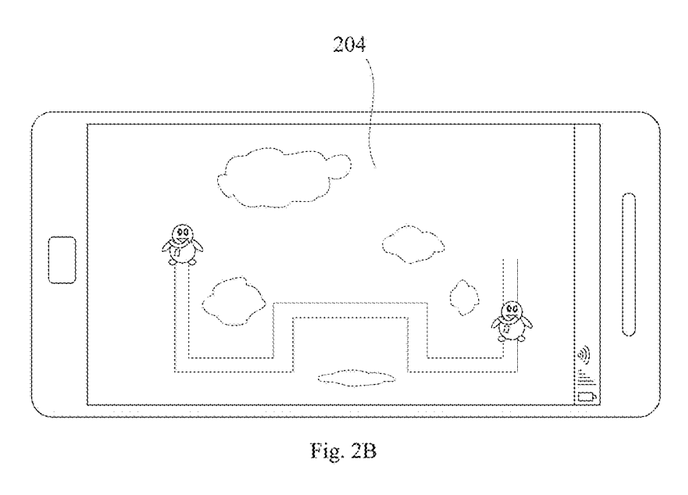

Firstly, the terminal collects the statistics on the application use condition in each state mode. As shown in FIG. 2A, the terminal is currently in a horizontal screen state mode, the user is using a video application, and the use duration of the video application is 2 hours by statistics. As shown in FIG. 2B, the use duration of a game "CarrotFantasy" is 0.5 hour by statistics in the same horizontal screen state mode. That is to say, in the horizontal screen state mode, the use duration of the video application is longer than that of the game "CarrotFantasy", and the use durations of the two applications are longer than those of other applications.

Figure 3:
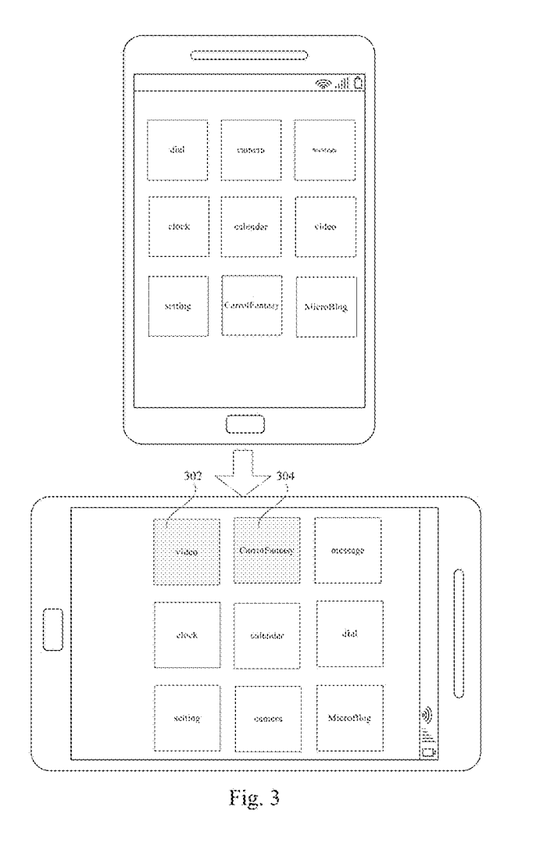
FIG. 3 shows a schematic diagram of adjusting the arrangement mode of application icons according to the statistical data in an embodiment of the present invention.

When the terminal enters the horizontal screen state mode next time, the terminal detects the state mode, calls the statistical data in the state mode, and adjusts the display status of the application icons according to the statistical data. As shown in FIG. 3, when the terminal is in a vertical screen state mode, the dial application and the camera application are in the front; when the terminal is switched to the horizontal screen state mode, the display order of the application icons is adjusted, namely, the video application 302 and the CarrotFantasy application 304 are displayed in the front, so that the user can quickly find the applications mostly used in the state mode.

Figure 4:
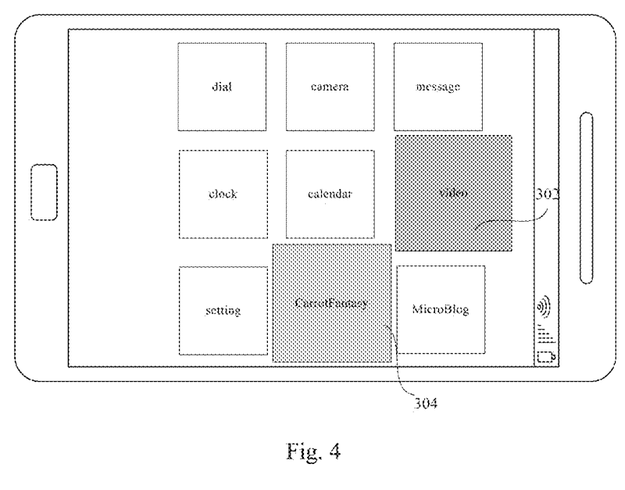
FIG. 4 shows a schematic diagram of adjusting the arrangement mode of application icons according to the statistical data in another embodiment of the present invention.

Besides the adjustment on the display positions of the application icons, other adjustment modes are available. As shown in FIG. 4, the display order of the applications is not changed, but the display size and color of the application icons are adjusted, namely, the icons of the video application 302 and the CarrotFantasy application 304 are enlarged and are deepened in color, so that the user can quickly note the mostly used applications.

It should be understood that, horizontal screen and vertical screen are only two states of the terminal, and any parameter setting of the terminal can be a state mode of the terminal, even setting the volume of the terminal or the brightness of a back light can also be regarded as a state mode of the terminal, for example, when the volume is set to be maximum, statistics on longest use duration of the music application is collected, so when the volume is set to be maximum, the music application may be displayed at the most prominent position of the desktop or the icon of the music application can be enlarged.

Figure 5:
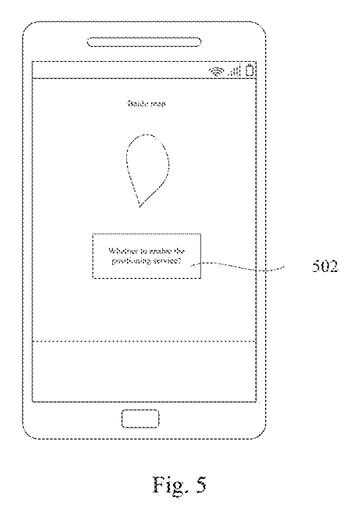
FIG. 5 shows a schematic diagram of reminding the user whether to switch the state mode of the terminal according to an embodiment of the present invention.

As shown in FIG. 5, it is supposed that when the terminal enables the positioning service (the terminal enters a state mode), statistics on longest use duration of Baidu map is collected. When the terminal detects that the Baidu map is started, it reminds the user whether to enable the positioning service 502 or directly enables the positioning service, thus facilitating the user to use.

Figure 6:
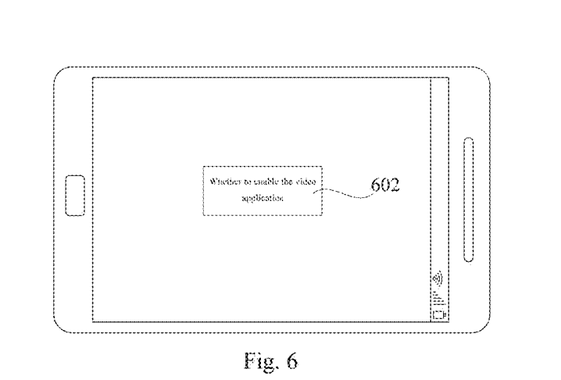
FIG. 6 shows a schematic diagram of reminding the user whether to start an application according to an embodiment of the present invention.

As shown in FIG. 6, it is supposed that the statistical use duration of the video application in the horizontal screen state mode is the longest, and when the terminal enters the horizontal screen state mode, it automatically reminds the user whether to enable the video application 602 or directly starts the video application, thus reducing the operation of the user.

Figure 7:
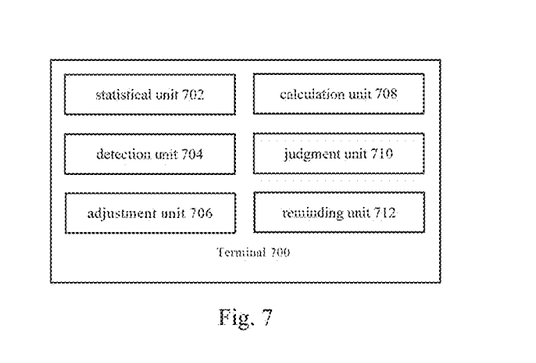
FIG. 7 shows a block diagram of a terminal according to an embodiment of the present invention.

FIG. 7 shows a block diagram of a terminal according to an embodiment of the present invention.

As shown in FIG. 7, the terminal 700 in the embodiment of the present invention includes: a statistical unit 702, used for collecting statistics on the running duration and/or use frequency of at least one application program in one or more state modes of a terminal; a detection unit 704, used for detecting the current state mode of the terminal; and an adjustment unit 706, connected to the statistical unit 702 and the detection unit 704, and used for, according to the statistical running duration and/or use frequency of the at least one application program in the current state mode, adjusting the display status of the application icon on a terminal interface.

The state mode of the terminal can be understood as a state of the terminal. The terminal has various set parameters, and once a user or the terminal sets a parameter, the set parameter can be regarded as a state of the terminal. For example, the user sets enabling a terminal positioning service, then a state mode of the terminal can be determined, and statistics on the running duration or use frequency of each application in the state mode can be collected. The display status of the application icon is adjusted according to the statistical data. For example, when the terminal enables the positioning service, statistics on longest use time of Baidu map application in the state mode is collected. When the terminal enables the positioning service next time, the terminal discovers that the use time of Baidu map is the longest, and then displays the icon of the Baidu map in the front of the desktop or highlights the icon of the Baidu map, thus facilitating the user to search.

Accordingly, the present invention can really consider the use habit of the user, statistics on the use condition of an application is collected in each parameter setting condition, running state or terminal pose of the terminal, and the display status of the application icon is adjusted according to the statistical data in the state mode when the terminal is detected to be in the previous state again.

In the above technical solution, preferably, the adjustment unit 706 is used for adjusting the color, shape and size of the application icon and/or the display position of the application icon on the terminal interface. The icon color of the application mostly used by the user can be changed into a color different from that of other applications, or the icon is enlarged, or the icon is displayed in the front of the interface.

In the above technical solution, preferably, the adjustment unit 706 is further used for adjusting the display status of each application icon according to the length of the running duration and/or the use frequency.

In the above technical solution, preferably, the state mode includes any one or more of a horizontal screen display mode, a vertical screen display mode and multiple scenario modes of the terminal, wherein the multiple scenario modes at least include a silent mode, a conference mode, an airplane mode and an outdoor mode. In fact, each parameter setting of the terminal can be referred to as a state mode, e.g., WIFI setting, Bluetooth setting, font setting, etc.

In any above technical solution, preferably, the terminal may further include: a calculation unit 708, used for calculating a state mode of longest running duration and/or highest use frequency of at least one application program in one or more state modes of the terminal; and a judgment unit 710, connected to the calculation unit 708, and used for, when any application program of the one or more application programs is started, judging whether the current state mode of the terminal corresponds to the state mode of longest running duration and/or highest use frequency of the any application program; wherein the adjustment unit is further used for, if the judgment result of the judgment unit is no, adjusting the current state mode of the terminal to the state mode of longest running duration and/or highest use frequency of the any application program.

When the user starts an application, the state mode of the terminal when the application is used previously can be judged according to the previous statistical data, and if the current state mode of the terminal is different from the judged state mode, the state mode of the terminal is switched.

It is supposed that the user uses Youku application most frequently in the horizontal screen state. When the user starts the Youku application, whether the terminal is currently in the horizontal screen state is judged, and if not, the user is reminded of switching the terminal to the horizontal screen state, thus satisfying the use habit of the user.

In any above technical solution, preferably, the terminal may further include: a reminding unit 712, connected to the detection unit 704, and used for, when the terminal is switched to the current state mode, reminding the user whether to enable the application program with the longest running duration and/or highest use frequency in the current state mode.

When the terminal enters a certain state mode, the terminal determines the application program mostly used by the user according to the state mode, and then reminds the user whether to enable the application program or directly enables the application program. For example, when the terminal enables the positioning service, the terminal judges that Baidu map is used mostly, and then reminds the user whether to enable the Baidu map or directly enables the Baidu map.

According to a further aspect of the present invention, provided is a program product stored in a nonvolatile machine readable medium and used for adjusting the display of an application icon, the program product including a machine executive instruction enabling a computer system to execute the following steps: collecting statistics on the running duration and/or use frequency of at least one application program in one or more state modes of a terminal; detecting the current state mode of the terminal; and according to the statistical running duration and/or use frequency of the at least one application program in the current state mode, adjusting the display status of the application icon on a terminal interface.

According to a still further aspect of the present invention, provided is a nonvolatile machine readable medium storing a program product for adjusting the display of an application icon, the program product including a machine executive instruction enabling a computer system to execute the following steps: collecting statistics on the running duration and/or use frequency of at least one application program in one or more state modes of a terminal; detecting the current state mode of the terminal; and according to the statistical running duration and/or use frequency of the at least one application program in the current state mode, adjusting the display status of the application icon on a terminal interface.

According to a still further aspect of the present invention, provided is a machine readable program, which enables a machine to execute the application icon adaptive adjustment method in any above technical solution.

According to a still further aspect of the present invention, provided is a storage medium storing a machine readable program, wherein the machine readable program enables a machine to execute the application icon adaptive adjustment method in any above technical solution.

The technical solutions of the present invention are described in detail above in combination with the accompanying drawings. In the present invention, the use condition of each application program of the terminal in each state mode is detected, and when the terminal enters a certain state mode, the display status of the application icon is adjusted according to the statistical application program use condition corresponding to the state mode, namely, the display position, size, color and the like of the application icon is adjusted, so that the user can conveniently find the desired application icon from a large number of application icons, and the time for searching the application program is greatly shortened.

Only preferred embodiments of the present invention are described above, but the present invention is not limited thereto. Various modifications and alterations may be made to the present invention for those skilled in the art. Any modifications, equivalent substitutions, improvements and the like made within the spirit and principle of the present invention shall fall into the protection scope of the present invention.

The invention claimed is:

1. An application icon adaptive adjustment method, comprising:
    collecting statistics on the running duration and/or use frequency of at least one application program in one or more state modes of a terminal;
    detecting the current state mode of the terminal;
    according to the statistical running duration and/or use frequency of the at least one application program in the current state mode, adjusting the display status of the application icon on a terminal interface;
    calculating a state mode of longest running duration and/or highest use frequency of at least one application program in one or more state modes of the terminal;
    when any application program of the one or more application programs is started, judging whether the current state mode of the terminal corresponds to the state mode of longest running duration and/or highest use frequency of the any application program; and
    if the judgment result is no, adjusting the current state mode of the terminal to the state mode of longest running duration and/or highest use frequency of the any application program.

2. The application icon adaptive adjustment method of claim 1, wherein the step of adjusting the display status of the application icon on the terminal interface comprises:
    adjusting the color, shape and size of the application icon and/or the display position of the application icon on the terminal interface.

3. The application icon adaptive adjustment method of claim 1, wherein the state mode comprises any one or more of a horizontal screen display mode, a vertical screen display mode and multiple scenario modes of the terminal; and the multiple scenario modes at least comprise a silent mode, a conference mode, an airplane mode and an outdoor mode.

4. The application icon adaptive adjustment method of claim 1, further comprising:
    when the terminal is switched to the current state mode, reminding the user whether to enable the application program with the longest running duration and/or highest use frequency in the current state mode.

5. The application icon adaptive adjustment method of claim 2, further comprising:
    when the terminal is switched to the current state mode, reminding the user whether to enable the application program with the longest running duration and/or highest use frequency in the current state mode.

6. The application icon adaptive adjustment method of claim 3, further comprising:
    when the terminal is switched to the current state mode, reminding the user whether to enable the application program with the longest running duration and/or highest use frequency in the current state mode.

7. A terminal, comprising:
    a statistical unit, used for collecting statistics on the running duration and/or use frequency of at least one application program in one or more state modes of a terminal;
    a detection unit, used for detecting the current state mode of the terminal;
    an adjustment unit, connected to the statistical unit and the detection unit, and used for, according to the statistical running duration and/or use frequency of the at least one application program in the current state mode, adjusting the display status of the application icon on a terminal interface;

a calculation unit, used for calculating a state mode of longest running duration and/or highest use frequency of at least one application program in one or more state modes of the terminal; and a judgment unit, connected to the calculation unit, and used for, when any application program of the one or more application programs is started, judging whether the current state mode of the terminal corresponds to the state mode of longest running duration and/or highest use frequency of the any application program;

wherein the adjustment unit is further used for, if the judgment result of the judgment unit is no, adjusting the current state mode of the terminal to the state mode of longest running duration and/or highest use frequency of the any application program.

8. The terminal of claim 7, wherein the adjustment unit is used for adjusting the color, shape and size of the application icon and/or the display position of the application icon on the terminal interface.

9. The terminal of claim 7, wherein the state mode comprises any one or more of a horizontal screen display mode, a vertical screen display mode and multiple scenario modes of the terminal, and the multiple scenario modes at least comprise a silent mode, a conference mode, an airplane mode and an outdoor mode.

10. The terminal of claim 7, further comprising:
a reminding unit, connected to the detection unit, and used for, when the terminal is switched to the current state mode, reminding the user whether to enable the application program with the longest running duration and/or highest use frequency in the current state mode.

11. The terminal of claim 8, further comprising:
a reminding unit, connected to the detection unit, and used for, when the terminal is switched to the current state mode, reminding the user whether to enable the application program with the longest running duration and/or highest use frequency in the current state mode.

12. The terminal of claim 9, further comprising:
a reminding unit, connected to the detection unit, and used for, when the terminal is switched to the current state mode, reminding the user whether to enable the application program with the longest running duration and/or highest use frequency in the current state mode.

* * * * *